United States Patent
Finnerty et al.

(10) Patent No.: US 10,106,406 B2
(45) Date of Patent: Oct. 23, 2018

(54) CHEMICAL REACTOR WITH MANIFOLD FOR MANAGEMENT OF A FLOW OF GASEOUS REACTION MEDIUM THERETO

(71) Applicant: Watt Fuel Cell Corp., Mount Pleasant, PA (US)

(72) Inventors: Caine M. Finnerty, Port Washington, NY (US); Paul DeWald, Scottdale, PA (US)

(73) Assignee: Watt Fuel Cell Corp., Mount Pleasant, PA (US)

( * ) Notice: Subject to any disclaimer, the term of this patent is extended or adjusted under 35 U.S.C. 154(b) by 114 days.

(21) Appl. No.: 15/033,812

(22) PCT Filed: Nov. 5, 2014

(86) PCT No.: PCT/US2014/064116
§ 371 (c)(1),
(2) Date: May 2, 2016

(87) PCT Pub. No.: WO2015/069762
PCT Pub. Date: May 14, 2015

(65) Prior Publication Data
US 2016/0264416 A1    Sep. 15, 2016

Related U.S. Application Data

(60) Provisional application No. 61/900,510, filed on Nov. 6, 2013, provisional application No. 61/900,543, filed on Nov. 6, 2013.

(51) Int. Cl.
*B01J 7/00* (2006.01)
*B01J 8/24* (2006.01)
(Continued)

(52) U.S. Cl.
CPC .............. *C01B 3/386* (2013.01); *B01J 4/001* (2013.01); *B01J 4/002* (2013.01); *B01J 4/005* (2013.01);
(Continued)

(58) Field of Classification Search
CPC .. C01B 3/386; B01J 4/001; B01J 4/002; B01J 4/005; B01J 7/00; B01J 8/0285;
(Continued)

(56) References Cited

U.S. PATENT DOCUMENTS 2,945,077 A    7/1960  Polk
3,518,284 A    6/1970  Foster
(Continued)

FOREIGN PATENT DOCUMENTS

CN    101087649 A    12/2007
EP    1 382 382 A1    1/2004
(Continued)

OTHER PUBLICATIONS

C. Finnerty, K. Kendall, G. A. Tompsett, Integrated Catalytic Burner/Micro-SOFC Design and Applications Electrochemistry, 68 (2) (2000) 519-521.
(Continued)

*Primary Examiner* — Huy Tram Nguyen
(74) *Attorney, Agent, or Firm* — Dilworth & Barrese, LLP.; Michael J. Musella, Esq.

(57) ABSTRACT

A chemical reactor (e.g. reformer reactor) system includes a manifold (126) for management of a flow of gaseous reaction medium thereto. Manifold (126) includes manifold housing (128) defining manifold chamber (129) and having at least one additional component selected from: a gas distributor (127); a heater; and a cavity having a seal within or adjacent to it.

18 Claims, 6 Drawing Sheets

(51) Int. Cl.
*C01B 3/38* (2006.01)
*B01J 12/00* (2006.01)
*B01J 4/00* (2006.01)
*B01J 8/06* (2006.01)
*B01J 8/02* (2006.01)
*B01J 8/18* (2006.01)
*B01J 19/00* (2006.01)
*B01J 19/24* (2006.01)

(52) U.S. Cl.
CPC ............... *B01J 7/00* (2013.01); *B01J 8/0285* (2013.01); *B01J 8/065* (2013.01); *B01J 8/067* (2013.01); *B01J 8/1836* (2013.01); *B01J 8/24* (2013.01); *B01J 12/005* (2013.01); *B01J 12/007* (2013.01); *B01J 19/0013* (2013.01); *B01J 19/0093* (2013.01); *B01J 19/2415* (2013.01); *B01J 19/2445* (2013.01); *B01J 2208/00389* (2013.01); *B01J 2208/00902* (2013.01); *B01J 2208/00911* (2013.01); *B01J 2219/002* (2013.01); *B01J 2219/00006* (2013.01); *B01J 2219/00058* (2013.01); *B01J 2219/00063* (2013.01); *B01J 2219/00069* (2013.01); *B01J 2219/00117* (2013.01); *B01J 2219/00132* (2013.01); *B01J 2219/00135* (2013.01); *B01J 2219/00155* (2013.01); *B01J 2219/00157* (2013.01); *B01J 2219/00159* (2013.01); *B01J 2219/00213* (2013.01); *B01J 2219/00234* (2013.01); *B01J 2219/00585* (2013.01); *C01B 2203/0233* (2013.01); *C01B 2203/0244* (2013.01); *C01B 2203/0261* (2013.01); *C01B 2203/085* (2013.01); *C01B 2203/0844* (2013.01); *C01B 2203/1223* (2013.01); *C01B 2203/1229* (2013.01); *C01B 2203/1235* (2013.01); *C01B 2203/1241* (2013.01); *C01B 2203/1247* (2013.01); *C01B 2203/141* (2013.01)

(58) Field of Classification Search
CPC ... B01J 8/065; B01J 8/1836; B01J 8/24; B01J 12/005; B01J 12/007; B01J 19/0093; B01J 19/2415; B01J 19/2445
USPC ........................................................ 422/198
See application file for complete search history.

(56) References Cited

U.S. PATENT DOCUMENTS

| | | |
|---|---|---|
| 3,560,167 A | 2/1971 | Bruckner et al. |
| 4,588,659 A | 5/1986 | Abens et al. |
| 4,751,057 A | 6/1988 | Westerman |
| 4,894,205 A | 1/1990 | Westerman et al. |
| 5,149,156 A | 9/1992 | Kleefeldt |
| 5,149,516 A | 9/1992 | Han et al. |
| 5,447,705 A | 9/1995 | Petit et al. |
| 5,527,631 A | 6/1996 | Singh et al. |
| 5,573,737 A | 11/1996 | Balachandrean et al. |
| 5,596,514 A | 1/1997 | Maher, Jr. et al. |
| 5,648,582 A | 7/1997 | Schmidt et al. |
| 5,690,763 A | 11/1997 | Ashmead et al. |
| 6,033,793 A | 3/2000 | Woods et al. |
| 6,284,398 B1 | 9/2001 | Kiryu |
| 6,296,814 B1 | 10/2001 | Bonk et al. |
| 6,379,586 B1 | 4/2002 | Zeng et al. |
| 6,383,469 B1 | 5/2002 | Lamla et al. |
| 6,383,670 B1 | 5/2002 | Edlund et al. |
| 6,402,989 B1 | 6/2002 | Gaffney |
| 6,403,049 B1 | 6/2002 | Van Keulen et al. |
| 6,447,940 B1 | 9/2002 | Ueda |
| 6,458,334 B1 | 10/2002 | Tamhankar et al. |
| 6,465,118 B1 | 10/2002 | Dickman et al. |
| 6,488,838 B1 | 12/2002 | Tonkovich et al. |
| 6,488,907 B1 | 12/2002 | Barnes et al. |
| 6,492,050 B1 | 12/2002 | Sammes |
| 6,521,204 B1 | 2/2003 | Borup et al. |
| 6,565,817 B1 | 5/2003 | Kiryu |
| 6,576,359 B2 | 6/2003 | Fronk |
| 6,585,940 B2 | 6/2003 | Abe et al. |
| 6,641,625 B1 | 11/2003 | Clawson et al. |
| 6,641,795 B2 | 11/2003 | Abe |
| 6,656,623 B2 | 12/2003 | Holmes et al. |
| 6,667,213 B2 | 12/2003 | Yu |
| 6,673,270 B1 | 1/2004 | De Jong et al. |
| 6,692,707 B1 | 2/2004 | Hirabayashi |
| 6,699,609 B2 | 3/2004 | Kotani et al. |
| 6,702,960 B1 | 3/2004 | Schaddenhorst et al. |
| 6,726,853 B2 | 4/2004 | Okado et al. |
| 6,749,958 B2 | 6/2004 | Pastula et al. |
| 6,770,106 B1 | 8/2004 | Okamoto et al. |
| 6,783,742 B2 | 8/2004 | Bentley et al. |
| 6,790,247 B2 | 9/2004 | Childress et al. |
| 6,790,431 B2 | 9/2004 | Wang et al. |
| 6,800,387 B2 | 10/2004 | Shimada et al. |
| 6,833,208 B2 | 12/2004 | Kotani et al. |
| 6,833,536 B2 | 12/2004 | Shigeura |
| 6,869,456 B2 | 3/2005 | Salemi et al. |
| 6,872,379 B2 | 3/2005 | Zahringer et al. |
| 6,878,667 B2 | 4/2005 | Gaffney et al. |
| 6,881,508 B2 | 4/2005 | Penev |
| 6,887,436 B1 | 5/2005 | Fisher et al. |
| 6,887,456 B2 | 5/2005 | Xu et al. |
| 6,921,596 B2 | 7/2005 | Kelly et al. |
| 6,932,950 B1 | 8/2005 | Guetlhuber |
| 6,984,371 B2 | 1/2006 | Zhao et al. |
| 7,001,867 B2 | 2/2006 | Jin et al. |
| 7,037,349 B2 | 3/2006 | Dauer et al. |
| 7,048,897 B1 | 5/2006 | Koripella et al. |
| 7,070,633 B2 | 7/2006 | Okada et al. |
| 7,070,752 B2 | 7/2006 | Zeng et al. |
| 7,132,184 B2 | 7/2006 | Ogino et al. |
| 7,090,826 B2 | 8/2006 | Jiang et al. |
| 7,101,531 B2 | 9/2006 | Kamijo |
| 7,115,233 B2 | 10/2006 | Okada et al. |
| 7,116,717 B1 | 10/2006 | Shore |
| 7,147,836 B2 | 12/2006 | Ebert et al. |
| 7,147,946 B2 | 12/2006 | Kawasumi et al. |
| 7,156,866 B1 | 1/2007 | Nakamura et al. |
| 7,189,371 B2 | 3/2007 | Iwasaki |
| 7,192,458 B2 | 3/2007 | Harness et al. |
| 7,232,352 B2 | 6/2007 | Splaine |
| 7,247,258 B2 | 7/2007 | Jung et al. |
| 7,285,247 B2 | 10/2007 | Smaling et al. |
| 7,294,421 B2 | 11/2007 | Noetzel et al. |
| 7,323,148 B2 | 1/2008 | Shah et al. |
| 7,328,691 B2 | 2/2008 | Hataura et al. |
| 7,335,432 B2 | 2/2008 | Koripella |
| 7,344,572 B2 | 3/2008 | Yamamoto |
| 7,344,687 B2 | 3/2008 | Oi et al. |
| 7,364,812 B2 | 4/2008 | Taylor et al. |
| 7,368,482 B2 | 5/2008 | Basini et al. |
| 7,422,810 B2 | 9/2008 | Venkataraman et al. |
| 7,490,580 B2 | 2/2009 | Hanai et al. |
| 7,578,861 B2 | 8/2009 | Kah et al. |
| 7,585,810 B2 | 9/2009 | Chen et al. |
| 7,625,414 B2 | 12/2009 | Nougler et al. |
| 7,632,320 B2 | 12/2009 | Tonkovich et al. |
| 7,691,509 B2 | 4/2010 | Han et al. |
| 7,704,618 B2 | 4/2010 | Venkataraman et al. |
| 7,736,399 B2 | 6/2010 | Ravenda et al. |
| 7,846,599 B2 | 12/2010 | Ballantine et al. |
| 7,858,214 B2 | 12/2010 | Kelly et al. |
| 7,888,278 B2 | 2/2011 | Rapier et al. |
| 7,901,814 B2 | 3/2011 | Venkataraman et al. |
| 7,976,787 B2 | 7/2011 | England et al. |
| 7,985,506 B2 | 7/2011 | Lee et al. |
| 7,985,509 B2 | 7/2011 | Kim et al. |
| 7,998,456 B2 | 10/2011 | Van Dijk et al. |
| 8,034,504 B2 | 10/2011 | Tsunoda et al. |
| 8,062,800 B2 | 11/2011 | Cho et al. |
| 8,142,941 B2 | 3/2012 | Bitoh |

(56) References Cited

U.S. PATENT DOCUMENTS

| | | |
|---|---|---|
| 8,158,289 B2 | 4/2012 | Cutright et al. |
| 8,173,310 B2 | 5/2012 | Son |
| 8,241,600 B1 | 8/2012 | Berry et al. |
| 8,257,669 B2 | 9/2012 | Jankowski |
| 8,277,524 B2 | 10/2012 | Keegan et al. |
| 8,298,711 B2 | 10/2012 | Yanase et al. |
| 8,304,122 B2 | 11/2012 | Pushusta et al. |
| 8,318,363 B2 | 11/2012 | Lim |
| 8,323,365 B2 | 12/2012 | Drnevich et al. |
| 8,337,757 B2 | 12/2012 | Roychoudhury et al. |
| 8,354,083 B2 | 1/2013 | Amsden et al. |
| 8,409,539 B2 * | 4/2013 | Olbert .................... B01J 8/001 423/416 |
| 8,486,162 B2 | 7/2013 | Kim et al. |
| 8,557,451 B2 | 10/2013 | Edlund et al. |
| 2003/0054215 A1 | 3/2003 | Doshi et al. |
| 2003/0064269 A1 | 4/2003 | Gittleman |
| 2003/0188486 A1 | 10/2003 | Tanaka et al. |
| 2003/0211021 A1 | 11/2003 | Oi et al. |
| 2003/0211373 A1 | 11/2003 | Ueda et al. |
| 2003/0218991 A1 | 11/2003 | Besecker et al. |
| 2003/0234455 A1 | 12/2003 | Mieney et al. |
| 2003/0235726 A1 | 12/2003 | Kelly et al. |
| 2004/0009104 A1 | 1/2004 | Kaupert et al. |
| 2004/0076562 A1 | 4/2004 | Manzanec et al. |
| 2004/0144030 A1 | 7/2004 | Smaling |
| 2004/0180247 A1 | 9/2004 | Higashiyama et al. |
| 2004/0191591 A1 | 9/2004 | Yamamoto |
| 2005/0008907 A1 | 1/2005 | Isozaki et al. |
| 2005/0028445 A1 | 2/2005 | Roychoudhury et al. |
| 2005/0069485 A1 | 3/2005 | Jung et al. |
| 2005/0081444 A1 | 4/2005 | Anumakonda et al. |
| 2005/0164046 A1 | 7/2005 | Fujihara et al. |
| 2005/0188615 A1 | 9/2005 | Sennoun et al. |
| 2005/0191533 A1 | 9/2005 | Kim et al. |
| 2005/0267606 A1 | 12/2005 | Barlett, Jr. et al. |
| 2006/0051634 A1 | 3/2006 | DeVries |
| 2006/0067861 A1 | 3/2006 | Tonkovich et al. |
| 2000/0133976 | 6/2006 | Male et al. |
| 2006/0133976 A1 | 6/2006 | Male et al. |
| 2006/0179717 A1 | 8/2006 | LaBarge |
| 2006/0248333 A1 | 11/2006 | Schaevitz et al. |
| 2007/0084118 A1 | 4/2007 | Kaeding et al. |
| 2007/0104641 A1 | 5/2007 | Ahmed et al. |
| 2007/0183949 A1 | 8/2007 | Fischer |
| 2007/0289215 A1 | 12/2007 | Hemmings et al. |
| 2008/0138273 A1 | 6/2008 | Jiang |
| 2008/0152070 A1 | 6/2008 | Rush et al. |
| 2008/0187797 A1 | 8/2008 | Edlund |
| 2008/0197086 A1 * | 8/2008 | Mosler .................... A61B 6/14 210/758 |
| 2009/0029205 A1 | 1/2009 | Venkataraman et al. |
| 2009/0104482 A1 | 4/2009 | Miyazaki |
| 2009/0208784 A1 | 8/2009 | Perry et al. |
| 2009/0291335 A1 | 11/2009 | Anzai |
| 2010/0015479 A1 | 1/2010 | Rusch et al. |
| 2010/0062292 A1 | 3/2010 | Lin et al. |
| 2010/0119894 A1 | 5/2010 | Ishida |
| 2010/0203404 A1 | 8/2010 | Miyazaki |
| 2010/0330446 A1 | 12/2010 | Lucka et al. |
| 2011/0039175 A1 | 2/2011 | Yokoyama et al. |
| 2011/0165483 A1 | 7/2011 | Yamamoto et al. |
| 2011/0189578 A1 * | 8/2011 | Crumm .................... H01M 8/24 429/461 |
| 2011/0269032 A1 | 11/2011 | Fischer et al. |
| 2012/0062166 A1 | 3/2012 | Thornton et al. |
| 2012/0088167 A1 | 4/2012 | Reiners et al. |
| 2012/0164547 A1 | 6/2012 | Weingaerthner et al. |
| 2012/0328969 A1 | 12/2012 | DeWald et al. |
| 2013/0028815 A1 | 1/2013 | Basini et al. |
| 2013/0056911 A1 | 3/2013 | Finnerty et al. |
| 2013/0059223 A1 | 3/2013 | Finnerty et al. |
| 2013/0230787 A1 | 9/2013 | Finnerty et al. |
| 2014/0335463 A1 | 11/2014 | Friedrich et al. |

FOREIGN PATENT DOCUMENTS

| | | |
|---|---|---|
| EP | 1382382 A1 | 1/2004 |
| EP | 1787950 A2 | 5/2007 |
| GB | 1314984 A | 4/1973 |
| JP | 62-165461 | 10/1987 |
| JP | 5-96149 | 4/1993 |
| WO | 9841394 A1 | 9/1998 |
| WO | 02099917 A2 | 12/2002 |
| WO | 2004/091771 A1 | 10/2004 |
| WO | 2004091771 A1 | 10/2004 |
| WO | 2006032644 A1 | 3/2006 |
| WO | 2006034868 A1 | 4/2006 |
| WO | 2008031024 A1 | 3/2008 |
| WO | 2009116977 A2 | 9/2009 |
| WO | 2011019825 A2 | 2/2011 |

OTHER PUBLICATIONS

K. Kendall, C. Finnerty, G.A. Tompsett, P. Windibank, and N. Coe, "Rapid Heating SOFC System for Hybrid Applications." Electrochemistry, vol. 68, No. 6, (2000) 403.

Finnerty C., Cunningham R.H., Ormerod R.M, "Development of a novel test system for in situ catalytic, electrocatalytic and electrochemical studies of internal fuel reforming in solid oxide fuel cells." Catalysis letters, vol. 66, No. 4, (2000) 221-226(6).

C. Finnerty, N.J. Coe, R.H. Cunningham and R.M. Ormerod, "Steam Reforming and Partial Oxidation of Methane over nickel/zirconia and doped nickel/zirconia anodes in working solid oxide fuel cells." Catalysis Today, in press (1998)

C. Finnerty, R.H. Cunningham and R.M. Ormerod, "Development of more tolerant nickel/zirconia anodes for solid oxide fuel cells running on natural gas." Proc. 3rd Eur. Conf. on SOFCs, 1998, 217-226.

C. Finnerty, R.H. Cunningham and R.M. Ormerod, "Combined Electrochemical and Catalytic studies of anodes in working solid oxide fuel cells" Proc. 3rd Eur. Conf. on SOFCs, 1998, 227-236.

C. Finnerty, R.H. Cunningham and R.M. Ormerod, "Study of the Catalysis and Surface Chemistry occurring at nickel/zirconia anodes in solid oxide fuel cells running on natural gas." Radiation Effects and Defects in Solids [ISSN 1042-0150]. vol. 151 pp. 77-82.

C. Finnerty, R.H. Cunningham, K. Kendall and R.M. Ormerod, "A novel test system for in situ catalytic and electrochemical measurements on fuel processing anodes in working solid oxide fuel cells." J. Chem. Soc. Chem. Comm., (1998) 915.

R.H. Cunningham, C. Finnerty, K. Kendall and R.M. Ormerod, "An in situ catalytic and electrochemical study of working nickel/zirconia anodes in tubular Solid Oxide Fuel Cells." Proc. 5th Int. Symp. on SOFCs, The Electrochem. Soc., 1997, 965-972.

R.H. Cunningham, C. Finnerty and R.M. Ormerod, "Study of Surface Carbon formed on working anodes of Solid Oxide Fuel Cells running on methane" Proc. 5th Int. Symp. on SOFCs, The Electrochem. Soc., 1997, 973-983.

Finnerty C, Cunningham RH, Ormerod RM, "Development of a novel solid oxide fuel cell system based on a tubular zirconia reactor." Radiaton Effects and Defects in Solids [ISSN 1042-0150]. vol. 151 pp. 71-76.

Finnerty, Caine, and David Coimbra, "Solid oxide fuel cells with novel internal geometry." U.S. Pat. No. 6,998,187. Feb. 14, 2006.

Finnerty C, Alston T, Ormerod RM, Kendall K, "A Solid Oxide Fuel Cell Demonstration Kit, Operated on Butane/Propane Portable Fuel Cells" Jun. 1999. ISBN 3-905592-3-7, Edited by F N Buchi, European Fuel Cell Forum.

Finnerty C, Cunningham RH, Ormerod RM, "In situ catalytic, electrocatalytic and electrochemical studies of fuel processing anodes in solid oxide fuel cells running on natural gas." Proceedings of 12th International Conference on Solid-state Ionics, Halkidiki, Greece Jun. 1999. International Society for Solid-state Ionics.

Finnerty C, Cunningham RH, Ormerod RM, "Internal reforming over Nickel/Zirconia Anodes in SOFCs: Influence of anode formulation, pre-treatment and operating conditions." Solid Oxide Fuel Cells VI Oct. 1999. 1999, Edited by S.C Singhal and M. Dokiya, Published by the Electrochemical Society, ISBN 1-56677-242-7.

(56) References Cited

OTHER PUBLICATIONS

Finnerty C, Ormerod RM, "Internal reforming and electrochemical performance studies of Doped Nickel/Zirconia anodes in SOFCs running on methane." Solid Oxide Fuel Cells VI, Oct. 1999. 1999, Edited by S.C Singhal and M. Dokiya, Published by the Electrochemical Society, ISSN 1-56677-242-7.
Caine Finnerty, Geoff. A. Tompsett, Kevin Kendall and R. Mark Ormerod, "SOFC system with integrated catalytic fuel processing." Journal of Power Sources, vol. 86, Issues 1-2, Mar. 2000, pp. 459-463.
Caine Finnerty, Neil J. Coe, Robert H. Cunningham and R. Mark Ormerod. "Carbon formation on and deactivation of nickel-based/zirconia anodes in solid oxide fuel cells running on methane." Catalysis Today, vol. 46, Issues 2-3, Nov. 16, 1998, pp. 137-145.
K. Kendall, C. Finnerty, G. Saunders and J. T. Chung, "Effects of dilution on methane entering an SOFC anode" Journal of Power Sources, vol. 106, Issues 1-2, Apr. 1, 2002, pp. 323-327.
G. A. Tompsett, C. Finnerty, K. Kendall, T. Alston and N. M. Sammes, "Novel applications for micro-SOFCs." Journal of Power Sources, vol. 86, Issues 1-2, Mar. 2000, pp. 376-382.
Caine Finnerty and R. Mark Ormerod, "Internal reforming over nickel/zirconia anodes in SOFCs operating on methane: Influence of anode formulation, pre-treatment and operating conditions." Journal of Power Sources, vol. 86, Issues 1-2, Mar. 2000, pp. 390-394.
C. Finnerty, T. Alston, K. Kendall and R.M. Ormerod, "Development of a small portable SOFC system with integrated catalytic fuel processing." Sixth Grove Fuel Cell Symposium, Sep. 1999, 125.
C. Finnerty, K. Kendall, J. C. Austin, T. Alston ,"Ceramic fuel cells to replace metal burners." Journal of Material science, 36, (2001) 1119-1124.
Ormerod RM, Finnerty CM, Cunningham RH, "In situ catalytic and electrocatalytic studies of internal fuel reforming in solid oxide fuel cells running on natural gas." Studies in Surface Science and Catalysis, Elsevier, [ISBN 0-444-50480-X]. 7 pp. 425-431.
P.K. Cheekatamarla, C.M. Finnerty et al., "Highly Efficient Next-Generation Tubular Solid Oxide Fuel Cells Powered by Readily Available Hydrocarbon Fuels", to be submitted to Nature, 2008.
P.K. Cheekatamarla, C. M. Finnerty, "Synthesis gas generation via partial oxidation reforming of liquid fuels." Accepted for publication, International Journal of Hydrogen Energy, 2008.
Y. Du, C. Finnerty, and J. Jiang, "Thermal Stability of Portable Microtubular SOFCs and Stacks." In press, Journal of the Electrochemical Society, 155(9), 1-XXXX, (2008).
Y. Du, C. Finnerty, and J. Jiang, "Thermal Stability of Portable Micro-Tubular Solid Oxide Fuel Cell and Stack" ECS Trans. 12, (1) 363 (2008).
P.K. Cheekatamarla, C.M. Finnerty , Jun Cai, "Internal reforming of hydrocarbon fuels in tubular solid oxide fuel cells." International Journal of Hydrogen Energy, vol. 33, Issue 7, Apr. 2008, pp. 1853-1858.
Praveen K. Cheekatamarla, C.M. Finnerty, "Reforming catalysts for hydrogen generation in fuel cell applications." Journal of Power Sources, vol. 160, Issue 1, Sep. 29, 2006, pp. 490-499.
P.K. Cheekatamarla, C.M. Finnerty, "Hydrogen Generation via partial oxidation reforming of liquid fuels." Prepr. Pap.-Am. hem. Soc., Div. Fuel Chem. 2007, 52 (2), 288.
P.K. Cheekatamarla, C.M. Finnerty , Jun Cai, "Internal reforming of hydrocarbon fuels in tubular solid oxide fuel cells." ECS Trans. 12, (1) 439 (2008).
P. K. Cheekatamarla, C. M. Finnerty, A. Stanley, C. Robinson, P. Dewald, Y. Lu. Y. Du, "Performance Characteristics of an Integrated Portable JPS SOFC—Reformer System." ECS Transactions vol. 5, Mar. 2007.
C.M. Finnerty, Y. Du, P.K. Cheekatamarla, B.J. Emley, W. Zhu, J. Cai, R. Sharp, "Geometric Effects on Tubular Solid Oxide Fuel Cells." ECS Transactions—Solid Oxide Fuel Cells, vol. 7, Jun. 2007.
C. Finnerty, C. Robinson, S. Andrews, Y. Du, P. Cheekatamarla, P. Dewald, Y. Lu, T. Schvvartz, "Portable Propane Micro-Tubular SOFC System Development." ECS Transactions—Solid Oxide Fuel Cells, vol. 7, Jun. 2007.
D. Bhattacharya, R. Rengaswamy and C. Finnerty, "Isothermal Models for Tubular Anode Supported Solid Oxide Fuel Cell", Chemical Engineering Science, 62(16), pp. 4250-4267, 2007.
D. Bhattacharya, R. Rengaswamy and C. Finnerty, "Dynamic Simulation and Analysis of a Solid Oxide Fuel Cell", In the proceedings of ESCAPE-17, Bucharest, 2007.
Debangsu Bhattacharya, Raghunathan Rengaswamy and Caine Finnerty, "Validation of a Phenomenological Steady-State Model for Solid Oxide Fuel Cell (SOFC)", presented at the Annual AIChE meeting, San Francisco, 2006.
Debangsu Bhattacharya, Raghunathan Rengaswamy and Caine Finnerty, "A Twodimensional Dynamic Model for Tubular Solid Oxide Fuel Cell", presented at the Annual AIChE meeting, San Francisco, 2006.
Debangsu Bhattacharya, Raghunathan Rengaswamy and Caine Finnerty, "Optimization Studies on Anode-Supported Tubular Solid Oxide Fuel Cells", presented at the Annual AIChE Meeting, Salt Lake City, 2007.
Debangsu Bhattacharya, Raghunathan Rengaswamy and Caine Finnerty, "Dynamics and Volterra-Model Based Control of a Tubular Solid Oxide Fuel Cell", presented at the Annual AIChE Meeting, Salt Lake City, 2007.
Debangsu Bhattacharya, Raghunathan Rengaswamy and Caine Finnerty, "Identification and Control of a Tubular Solid Oxide Fuel Cell ( SOFC)", presented at the Annual AIChE meeting, Philadelphia, 2008.
Praveen K. Cheekatamarla, Caine M. Finnerty, Yanhai Du, Juan Jiang, Jian Dong, P.G. Dewald, C. R. Robinson, Advanced tubular solid oxide fuel cells with high efficiency for internal reforming of hydrocarbon fuels Original Research Article; Journal of Power Sources, vol. 188, Issue 2, Mar. 15, 2009, pp. 521-526.
Praveen K. Cheekatamarla, Caine M. Finnerty, Charles R. Robinson, Stanley M. Andrews, Jonathan A. Brodie, Y. Lu, Paul G. Dewald, "Design, integration and demonstration of a 50 W JP8/kerosene fueled portable SOFC power generator", Original Research Article Journal of Power Sources, vol. 193, Issue 2, Sep. 5, 2009, pp. 797-803.
Debangsu Bhattacharyya, Raghunathan Rengaswamy, Caine Finnerty, "Dynamic modeling and validation studies of a tubular solid oxide fuel cell." Original Research Article Chemical Engineering Science, vol. 64, Issue 9, May 1, 2009, pp. 2158-2172.
Zuo, Chendong et al. "Advanced Anode-supported Micro-tubular SOFC Development."ECS Transactions 17.1 (2009): 103-110.
Finnerty, Caine, and David Coimbra, "Anode-supported solid oxide fuel cells using a cermet electrolyte." U.S. Pat. No. 7,498,095. Mar. 3, 2009.
Finnerty, Caine M. "The catalysis and electrical performance of nickel-based/zirconia fuel reforming anodes in solid oxide fuel cells running on methane." Diss. University of Keele, 1998.
Khaligh, Alireza, et al. "Digital control of an isolated active hybrid fuel cell/Li-ion battery power supply." IEEE Transactions on Vehicular technology 56.6 (2007): 3709-3721.
Lankin, Michael, Yanhai Du, and Caine Finnerty, "A review of the implications of silica in solid oxide fuel cells." Journal of Fuel Cell Science and Technology 8.5 (2011): 054001.

\* cited by examiner

CHEMICAL REACTOR WITH MANIFOLD FOR MANAGEMENT OF A FLOW OF GASEOUS REACTION MEDIUM THERETO

CROSS REFERENCE TO RELATED APPLICATIONS

This application is a national stage of International Application No. PCT/US2014/064116, which was filed on Nov. 5, 2014, and which claims priority to U.S. Provisional Application No. 61/900,543 filed on Nov. 6, 2013, and U.S. Provisional Application No. 61/900,510 filed on Nov. 6, 2013, the entire contents of each of which are incorporated herein by reference.

BACKGROUND

The present teachings relates to chemical reactors and, more particularly, to chemical reactors in which a gaseous reaction medium is made to undergo conversion to desired product(s).

The conversion of a gaseous or vaporized liquid reformable fuel to a hydrogen-rich carbon monoxide-containing gas mixture, a product commonly referred to as "synthesis gas" or "syngas," can be carried out in accordance with any of such well known gas phase fuel reforming operations as steam reforming, dry reforming, autothermal reforming and catalytic partial oxidation (CPOX) reforming. Each of these fuel reforming operations has its distinctive chemistry and requirements and each is marked by its advantages and disadvantages relative to the others.

The development of improved fuel reformers, fuel reformer components, and reforming processes continues to be the focus of considerable research due to the potential of fuel cells, i.e., devices for the electrochemical conversion of electrochemically oxidizable fuels such hydrogen, mixtures of hydrogen and carbon monoxide, and the like, to electricity, to play a greatly expanded role for general applications including main power units (MPUs) and auxiliary power units (APUs). Fuel cells also can be used for specialized applications, for example, as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) are widely believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as convertors of such fuels to electricity, and the integration of fuel reformers and fuel cells into more compact, reliable and efficient devices for the production of electrical energy.

SUMMARY

The present teachings, while generally applicable to gas phase reactors of all types for conducting all manner of gas phase reactions, will be specifically exemplified herein by gas phase reformers and methods for the gas phase reforming of liquid and gaseous reformable fuels to produce hydrogen-rich reformates. Such reformates can be utilized for a wide variety of purposes, e.g., as chemical reactants and as fuels for conversion within fuel cells to electricity.

A chemical reactor system of the present teachings can include a chemical reactor having an inlet; and a manifold in fluid communication with the inlet of the chemical reactor. The manifold can include a manifold housing, the manifold housing defining a manifold chamber. The manifold can include at least one additional component selected from a gaseous reactants distributor disposed within, and extending for at least a majority of the length of, the manifold chamber, where the gaseous reactants distributor is in fluid communication with a gaseous reactants conduit, and the gaseous reactants distributor comprises one or more outlets located opposite the inlet of the chemical reactor; a heater in thermal communication with the manifold chamber; and a cavity, where the manifold housing defines the cavity, and a seal can be disposed within or adjacent to the cavity. The seal can engage the inlet of the chemical reactor thereby providing a gas-tight seal between the manifold housing and the inlet. The seal can be a gasket.

The chemical reactor can be a fixed bed reactor, a fluidized bed reactor, a microchannel reactor, a shell-and-tube reactor, a tubular reactor, a multi-tubular reactor, or a combination thereof.

The chemical reactor can be adapted to carrying out a gas phase reaction selected from the group consisting of acetylation, addition reactions, alkylation, dealkylation, hydrodealkylation, reductive alkylation, amination, aromatization, arylation, reforming, carbonylation, decarbonylation, reductive carbonylation, carboxylation, reductive carboxylation, reductive coupling, condensation, cracking, hydrocracking, cyclization, cyclooligomerization, combustion, dehalogenation, dimerization, epoxidation, esterification, exchange, Fischer-Tropsch, gasification, halogenation, hydrohalogenation, homologation, hydration, dehydration, hydrogenation, dehydrogenation, hydrocarboxylation, hydroformylation, hydrogenolysis, hydrometallation, hydrolysis, hydroprocessing, hydrotreating, isomerization, methylation, demethylation, metathesis, nitration, oxidation, partial oxidation, polymerization, reduction, sulfonation, telomerization, transesterification, trimerization and water gas shift.

The chemical reactor can include a plurality of tubular reactor units.

The manifold housing can be fabricated from a material that remains thermally and mechanically stable at the temperature of operation of the chemical reactor.

The heater can be an electrical resistance heater disposed within the manifold chamber and/or at least one thermally conductive element in thermal communication with the manifold and a reaction zone of chemical reactor.

A reformer system for reforming at least one reformable fuel to produce a hydrogen-rich reformate, where the reformer system can include a reformer reactor unit having an inlet; and a manifold in fluid communication with the inlet of the at least one reformer reactor unit. The manifold can include a manifold housing, the manifold housing defining a manifold chamber. The manifold can include at least one additional component selected from a gaseous reforming reactants distributor disposed within, and extending for at least a majority of the length of the manifold chamber, where the gaseous reactants distributor is in fluid communication with a reactants conduit, and the gaseous reactants distributor comprises one or more outlets located opposite the inlet of the reformer reactor; a heater in thermal communication with the manifold chamber; and a cavity, where the manifold housing defines the cavity, and a seal is disposed within or adjacent to the cavity. The seal can engage the inlet of the reformer reactor thereby providing a gas-tight seal between the manifold housing and the inlet.

The reformer system where the manifold housing can be fabricated from a material that remains thermally and mechanically stable at the temperature of the reforming reaction zone during operation of the at least one reformer reactor.

In accordance with the present teachings, a chemical reactor system can include:

(a) at least one reactor unit having an inlet end and associated inlet for admission of gaseous reaction medium, a gas phase reaction zone wherein gaseous reaction medium undergoes gas phase reaction to produce reaction product(s), an outlet end and associated outlet for the outflow of such reaction product(s);

(b) a manifold in gas flow communication with the inlet of the at least one reactor, the manifold comprising a housing having a wall thickness, the housing defining a manifold chamber and having at least one additional component selected from the group consisting of:

(i) a gaseous reaction medium distributor disposed within, and extending for at least a major part of the length of, the manifold chamber, the distributor being in gas flow communication with a conduit for delivering a flow of gaseous reaction medium to the distributor, the distributor having an outlet or multiple outlets and arranged to discharge gaseous reaction medium flowing within the distributor into the manifold chamber in a path that is initially away from the inlet of the at least one reactor and thereafter toward the inlet of the at least one reactor, (ii) a heater for maintaining the temperature of the manifold chamber above the condensation temperature of the gaseous reaction medium or component(s) thereof and/or for rendering the gaseous reaction medium therein more uniform in temperature prior to the gaseous reaction medium entering the inlet of the at least one reactor, and (iii) a cavity defined within a section of wall of the housing and a gasket disposed within the cavity, the gasket engaging the inlet end of the at least one reactor unit thereby providing a gas-tight seal between the wall of the housing and the inlet end of the reactor.

The manifold component of the chemical reactor system herein can provide several benefits for the management of reactor operation. One such benefit can be the substantially uniform distribution of gaseous reaction medium throughout the full cross section of the reactor inlet, or in the case of a reactor possessing an array of reactor units such as the embodiments of the gas phase reformers described below, the substantially uniform distribution of gaseous reaction to the inlets of each reactor unit in the array whereby no one reactor unit receives a significantly greater amount of gaseous reaction medium than another reactor unit.

Another benefit of the manifold component can be its ability to limit or restrain the occurrence of turbulent flow within the manifold chamber, a benefit which also can contribute to the maintenance of low back pressure throughout the reactor and the reactor system.

Yet another benefit of the manifold component can be its ability to provide essentially laminar flow of gaseous reaction medium at the reactor inlet(s), another factor that can favor the maintenance of low back pressure throughout the reactor and the reactor system.

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

DETAILED DESCRIPTION

Figure 1A:
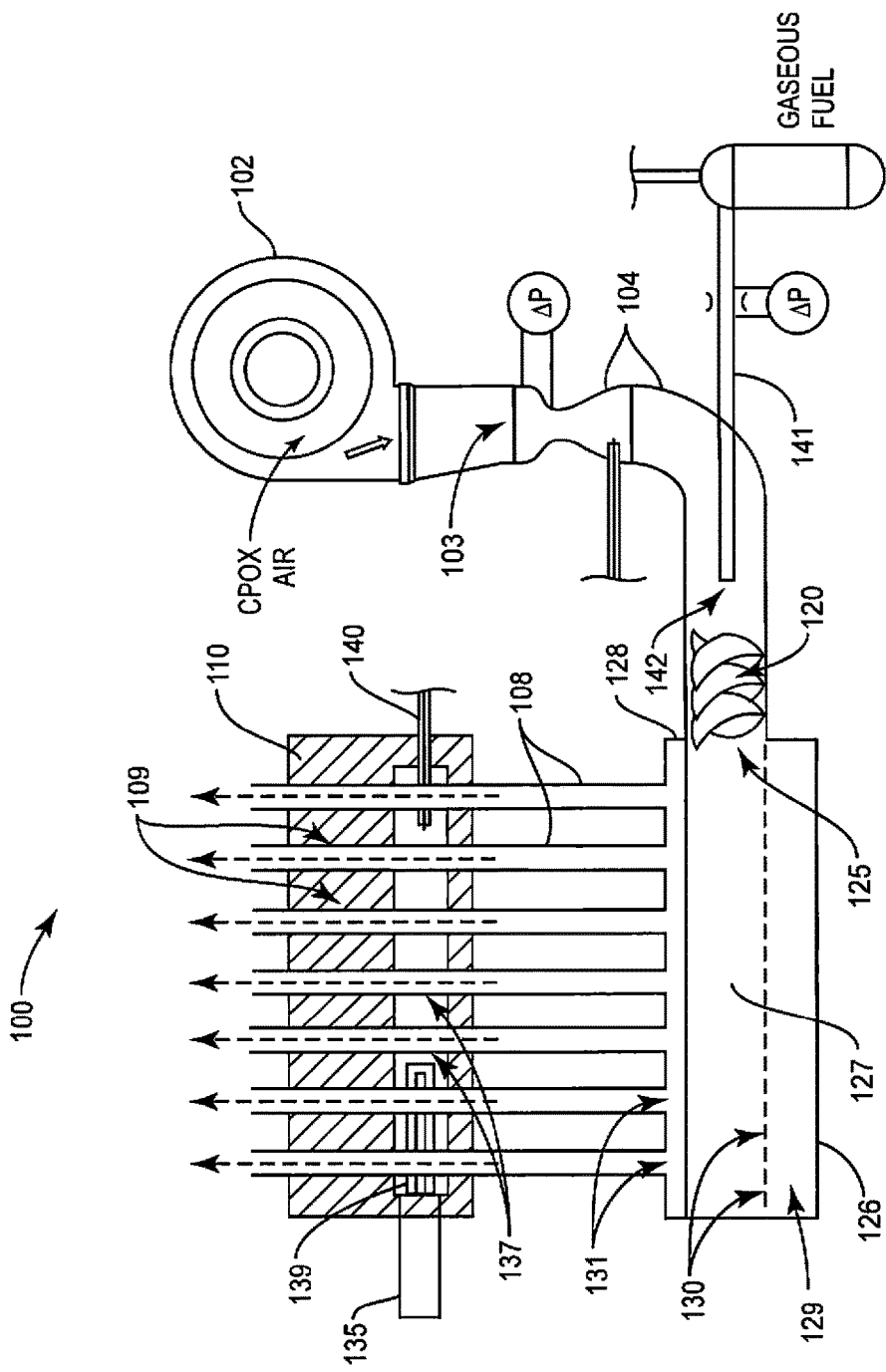
FIG. 1A is a longitudinal cross section view of an embodiment of a gaseous fuel CPOX reformer incorporating a manifold component in accordance with the present teachings.

It is to be understood that the present teachings herein are not limited to the particular procedures, materials and modifications described and as such can vary. It is also to be understood that the terminology used is for purposes of describing particular embodiments only and is not intended to limit the scope of the present teachings which will be limited only by the appended claims.

For brevity, the discussion and description herein will mainly focus on partial oxidation reforming reactions and reactants including catalytic partial oxidation reforming reactions and reactants (a reformable fuel and an oxygen-containing gas). However, the devices, assemblies, systems and methods described herein can apply to other reforming reactions such as steam reforming and autothermal reforming and their respective reactants (a reformable fuel and steam, and a reformable fuel, steam and an oxygen-containing gas, respectively) as well as the other gas phase reactions described herein. Accordingly, where an oxygen-containing gas is referenced herein in connection with a device or method, the present teachings should be considered as including steam in combination or alone, i.e., an oxygen-containing gas and/or steam, unless explicitly stated otherwise or understood by the context. In addition, where a reformable fuel is referenced herein in connection with a device or method, the present teachings should be considered as including steam in combination or alone, i.e., a reformable fuel and/or steam, unless explicitly stated otherwise or as understood by the context.

In addition, the liquid and gaseous reformable fuel reforming systems including a manifold and methods of the present teachings should be understood to be suitable for use with liquid and/or gaseous reactants to carry out steam reforming and auto thermal reforming. For example, the delivery, control and management of a steam or auto thermal reforming system can occur within the same structure and components and/or with the same general methods as described herein. That is, the reforming systems and methods of the present teachings can deliver the appropriate liquid reactants, for example, liquid reformable fuel and/or liquid water, from a liquid reformable fuel reservoir to a vaporizer to create a vaporized liquid reformable fuel and steam, respectively, and the appropriate gaseous reactants, for example, at least one of an oxygen-containing gas, a gaseous reformable fuel and steam, from their respective sources, where the vaporized liquid reformable fuel, steam and other gaseous reactants can be delivered through a manifold of the present teachings to a desired component of a fuel cell unit or system such as a reformer.

Where water is used in the delivery system, recycled heat from one or more of a reformer, a fuel cell stack and an afterburner of a fuel cell unit or system can be used to vaporize the water to create steam, which can be present in the delivery system and/or introduced into the delivery system from an independent source.

Throughout the specification and claims, where structures, devices, apparatus, compositions, etc., are described as having, including or comprising specific components, or where methods are described as having, including or comprising specific method steps, it is contemplated that such structures, devices, apparatus, compositions, etc., also consist essentially of, or consist of, the recited components and that such methods also consist essentially of, or consist of, the recited method steps.

In the specification and claims, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a structure, device, apparatus or composition, or a method described herein, can be combined in a variety of ways without departing from the focus and scope of the present teachings whether explicit or implicit therein. For example, where reference is made to a particular structure, that structure can be used in various embodiments of the apparatus and/or method of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, unless steps by their nature must be conducted in sequence, they can be conducted simultaneously.

At various places in the present specification, numerical values are disclosed as ranges of values. It is specifically intended that a range of numerical values disclosed herein include each and every value within the range and any subrange thereof. For example, a numerical value within the range of from 0 to 20 is specifically intended to individually disclose 0, 1, 2, 3, 4, 5, 6, 7, 8, 9, 10, 11, 12, 13, 14, 15, 16, 17, 18, 19 and 20 and any subrange thereof, for example, from 0 to 10, from 8 to 16, from 16 to 20, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of liquid fuel CPOX reformers of the present teachings illustrated in certain of the accompanying figures.

As used herein, a "reformable fuel" refers to a liquid reformable fuel and/or a gaseous reformable fuel.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "gaseous reforming reaction mixture" refers to a mixture including a gaseous liquid reformable fuel (e.g., a vaporized liquid reformable fuel), a gaseous reformable fuel or combinations thereof, and an oxygen-containing gas (e.g., air) and/or water (e.g., in the form of steam). A gaseous reforming reaction mixture can be subjected to a reforming reaction to create a hydrogen-rich product ("reformate"), which also can contain carbon monoxide. Where a catalytic partial oxidation reforming reaction is to be carried out, the gaseous reforming reaction mixture can be referred to a "gaseous CPOX reforming reaction mixture," which includes a reformable fuel and an oxygen-containing gas. Where a steam reforming reaction is to be carried out, the gaseous reforming reaction mixture can be referred to as a "gaseous steam reforming reaction mixture," which includes a reformable fuel and steam. Where an autothermal reforming reaction is to be carried out, the gaseous reforming reaction mixture can be referred to as a "gaseous AT reforming reaction mixture," which includes a reformable fuel, an oxygen-containing gas and steam.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and ammonia, and the like, that when subjected to reforming undergo conversion to hydrogen-rich reformates.

The term "reforming reaction" shall be understood to include the exothermic and/or endothermic reaction(s) that occur during the conversion of a gaseous reaction medium to a hydrogen-rich reformate. The expression "reforming reaction" herein therefore includes, for example, CPOX, autothermal and steam reforming.

Again, as stated previously for brevity, the discussion and description herein will focus on partial oxidation reforming reactions and reactants including catalytic partial oxidation reforming reactions and reactants (a reformable fuel and an oxygen-containing gas). However, the devices, assemblies, systems and methods described herein can equally apply to other reforming reactions such as steam reforming and autothermal reforming and their respective reactants as well as the other gas phase reactions described herein. For example, for steam reforming steam can replace an oxygen-containing gas in the description herein. For autothermal reforming, steam can be introduced along with an oxygen-containing gas and/or a reformable fuel in the description herein.

As used herein, the terms "reactor," "reactor unit," "chemical reactor," and "chemical reactor unit" shall be understood to include chemical conversion reactors and electrochemical conversion reactors, e.g., fuel cells, as well as combinations of the two, in particular, integrated reformer-fuel cell systems.

The chemical reactor of the present teachings with its manifold component for distribution of gaseous reaction medium to the inlet of the at least one reactor unit thereof is applicable to all chemical reactors in which a gaseous reaction medium is made to undergo conversion to desired product(s). For example, and without limitation, the present teachings are broadly applicable to gas phase reactors of all types such as fixed bed, fluidized bed, microchannel, shell-and-tube, tubular, multi-tubular, and the like, reactors for carrying out any of numerous kinds of gas phase reactions such as acetylation, addition reactions, alkylation, dealkylation, hydrodealkylation, reductive alkylation, amination, aromatization, arylation, reforming, carbonylation, decarbonylation, reductive carbonylation, carboxylation, reductive carboxylation, reductive coupling, condensation, cracking, hydrocracking, cyclization, cyclooligomerization, combustion, dehalogenation, dimerization, epoxidation, esterification, exchange, Fischer-Tropsch, gasification, halogenation, hydrohalogenation, homologation, hydration, dehydration, hydrogenation, dehydrogenation, hydrocarboxylation, hydroformylation, hydrogenolysis, hydrometallation, hydrolysis, hydroprocessing, hydrotreating (HDS/HDN), isomerization, methylation, demethylation, metathesis, nitration, oxidation, partial oxidation, polymerization, reduction, sulfonation, telomerization, transesterification, trimerization, water gas shift, and the like.

The chemical reactor of the present teachings will now be specifically described in detail in connection with the embodiments of gaseous fuel catalytic partial oxidation (CPOX) reformer of FIGS. 1A and 1B and liquid fuel CPOX reformer of FIGS. 2A and 2B.

Figure 1B:
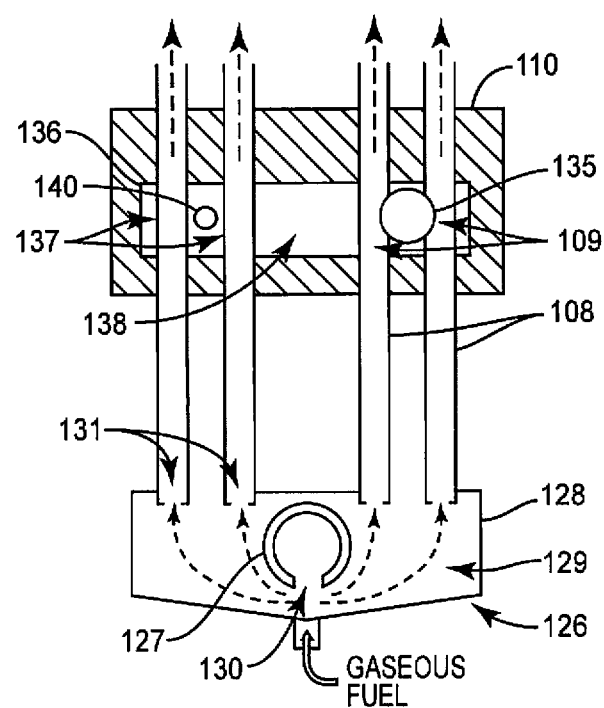
FIG. 1B is a lateral (perpendicular to the longitudinal axis) cross section view of the gaseous fuel CPOX reformer illustrated in FIG. 1A.

As shown in FIGS. 1A and 1B, air as an oxygen-containing gas, typically at ambient temperature, is introduced into gaseous fuel CPOX reformer 100 at a preset mass flow rate via centrifugal blower 102 through inlet 103 of conduit 104. The propane is introduced into conduit 104 via fuel line 111 and fuel inlet 112. Propane and air begin to combine in mixing zone 120 of conduit 104 to provide a gaseous CPOX reaction mixture. A mixer of any suitable kind, for example, a static mixer disposed within mixing zone 120 and/or a helically-grooved internal wall surface of conduit 104, can be included to provide a gaseous CPOX reaction mixture of greater compositional uniformity than otherwise would form in mixing zone 120.

Following its passage through the optional static mixer and/or contact with helical grooves disposed within mixing zone 120, gaseous CPOX reaction mixture exits conduit 104 through outlet 125 and enters gaseous reaction medium (gas) distributor 127 of manifold 126 the function of which is to provide a uniform distribution of the gaseous reaction medium to, and within, tubular CPOX reactor units 108. Such an arrangement or other arrangement within the present teachings can provide a distribution of gaseous CPOX reaction mixture where the difference in flow rate of the gaseous CPOX reaction mixture within any two CPOX reactor units is not greater than about 20 percent, for example, not greater than about 10 percent or not greater than about 5 percent.

Manifold 126 includes manifold housing, or enclosure, 128 defining manifold chamber 129 within which gas distributor 127 is connected to outlet 125 of conduit 104. Gaseous CPOX reaction mixture exiting conduit 104 through outlet 125 enters gas distributor 127 thereafter passing outwardly through apertures (e.g., holes or slots) 130 located at the bottom or lower part of the gas distributor, the gas then flowing around the exterior surface of the distributor to its top or upper part and from there into inlets 131 of tubular CPOX reactor units 108. The path of the gaseous CPOX reaction mixture as it passes through apertures 130 and into inlets 131 is shown in FIG. 1B.

Some specific factors that can bear upon the optimization of the design of manifold 126 for accomplishing its function of uniformly distributing gaseous CPOX reaction mixture to CPOX reactor units 108 include the configuration of its housing 128, the volume of its chamber 129, and the dimensions of gas distributor 127 including the number, design and placement of its apertures 130. Such factors in turn depend on such reformer design and operational factors as the target flow rates of gaseous CPOX reaction mixture within a conduit, the number and arrangement of CPOX reactor units 108, the shape and dimensions of inlets 131 of CPOX reactor units 108, and similar considerations. A manifold of optimal fuel-air distribution performance for a particular gaseous fuel CPOX reformer in accordance with the present teachings can be readily constructed by those skilled in the art employing routine testing methods.

Where a CPOX reaction zone of a CPOX reactor unit is substantially coextensive with the length of the reactor unit, manifold housing 128 can be fabricated from a material that remains thermally and mechanically stable at the high temperatures that are typical of CPOX reforming. In these embodiments, various kinds of refractory materials, including refractory composites such as carbon fiber- and/or glass fiber-reinforced ceramics, are suitable for fabricating the manifold housing. Suitable materials of construction include dense ceramics such as various known types of alumina, recrystallized alumina, alumino-silicates, boron nitride, glass-ceramics, magnesium oxide, zirconium phosphate, and the like, metals such as nickel-chromium-based super alloys, Hastelloy super alloys, and the like. However, these and other refractory materials tend to be relatively high in cost and can also be challenging to work with, especially in the case of manufacturing articles with relatively complex configurations.

Figure 1C:
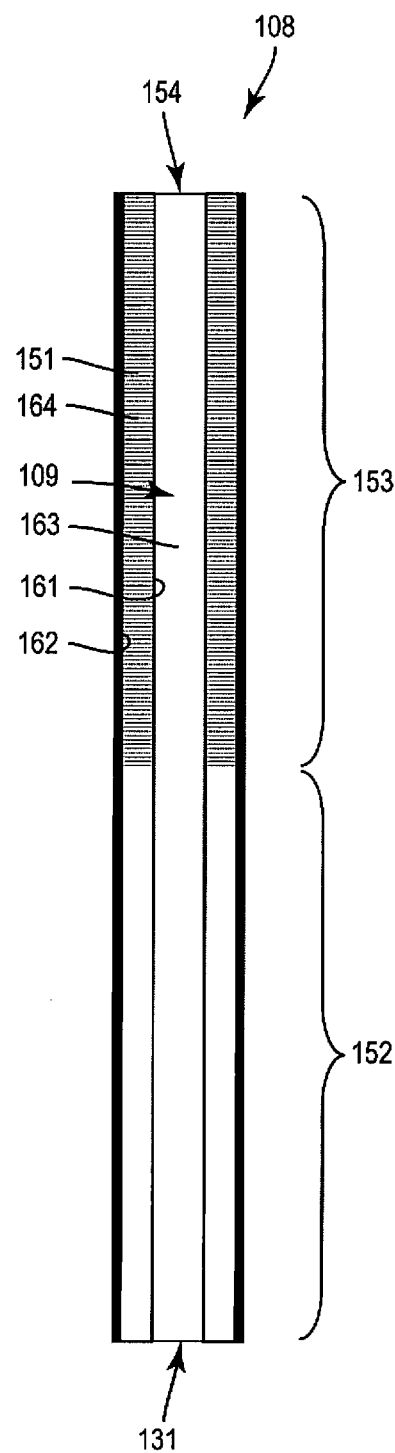
FIGS. 1C and 1D are enlarged longitudinal and lateral cross section views, respectively, of one of the tubular CPOX reactor units shown in FIGS. 1A and 2A.

As shown in the enlarged longitudinal cross section view of exemplary CPOX reactor unit 108 illustrated in FIG. 1C, gas-permeable wall 151 of CPOX reactor units 108 can be divided along its length into a first, or upstream, region 152, starting at its fuel-air mixture inlet 131, that is substantially devoid of CPOX catalyst, and a second, or downstream, region 153, starting at the end of first region 152 and ending at or proximate to product reformate effluent outlet 154 of the reactor unit, that contains a catalytically effective amount of CPOX catalyst 164. During steady-state operation of CPOX reformer 100 of FIG. 1A, this embodiment of CPOX reactor unit 108 largely confines hot CPOX reaction zones 109 to their second regions 153 leaving their essentially CPOX catalyst-free first regions 152 to remain at a considerably lower temperature, for example, in the region of from ambient up to about 350° C., particularly at the juncture of fuel-air mixture inlets 131 of CPOX reactor units 108 and manifold housing 128.

The lower temperature of a CPOX catalyst-free wall section zone, which temperature is lower than the melting temperature of many thermoplastic resins and below the thermal degradation temperature of many thermoset resins, makes it practical and advantageous to utilize any of several families of thermoplastic and thermoset resins for the manufacture of manifold housing 128. Specific types of thermoplastic and thermoset resins that can be used for the fabrication of a manifold housing include polyetherimide (PEI), polyaryletherketones (PAEKs) such as polyether ether ketone (PEEK), phenol-formaldehyde resins, and the like. These and other thermally stable resins, in addition to their relatively low material cost, have the added advantage of being readily formable into complex shapes employing low cost manufacturing procedures such as extrusion molding, vacuum molding, injection molding, reaction injection molding, rotational molding, and the like, and are therefore well suited for making manifold housings having relatively complex geometries.

Figure 1D:
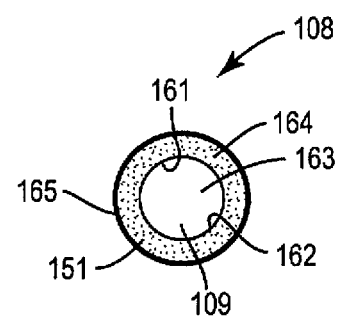
Figure 1E:
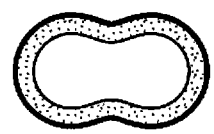
FIGS. 1E and 1F are enlarged lateral cross section views of two embodiments of tubular CPOX reactor units of CPOX reformers of the present teachings.
Figure 1F:
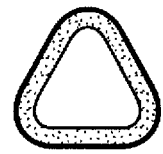

CPOX reactor unit 108, in addition to the circular cross section shown in FIG. 1D, can assume other cross sectional configurations such as those illustrated in FIGS. 1E and 1F. Thus, for example, FIG. 1E illustrates a CPOX reactor unit having an alternating concave-convex, or bilobate, cross section. CPOX reactor units having such a cross sectional configuration can be especially advantageous where their outlet sections are to be joined to, or mated with, similarly configured tubular solid oxide fuel cell (SOFC) units as in the SOFC fuel cell assembly of co-pending, commonly assigned U.S. Patent Application Publication No. 2013/0230787, by Finnerty et al., the entire contents of which are incorporated by reference herein.

From manifold 126, gaseous CPOX reaction mixture enters inlets 131 of CPOX reactor units 108 and into CPOX reaction zones 109 where the reaction mixture undergoes gas phase CPOX reaction to produce a hydrogen-rich, carbon monoxide-containing reformate. In the start-up mode, one or more igniters 135 initiates CPOX. After CPOX becomes self-sustaining, for example, when the temperature of the reaction zone reaches from about 250° C. to about 1100° C., the igniter(s) can be shut off as external ignition is no longer required to maintain the now self-sustaining CPOX reaction. Thermal insulation 110, for example, of the microporous or alumina-based refractory type, surrounds those portions of the CPOX reformer to reduce thermal losses from these components.

As shown in the enlarged longitudinal and lateral cross section views, respectively, of tubular CPOX reactor unit 108 illustrated in FIGS. 1C and 1D, gas permeable wall 151 of reactor unit 108 includes an inner surface 161, an outer surface 162, an open gaseous flow passageway 163 confined by gas-permeable wall 151, a portion of which constitutes CPOX reaction zone 109, a hydrogen gas barrier 165 attached to outer surface 162 and a catalytically effective amount of CPOX catalyst 164 supported within and/or comprising the structure of at least the section of gas-permeable wall 151 corresponding to second region 153 and CPOX reaction zone 109.

Figure 1G:
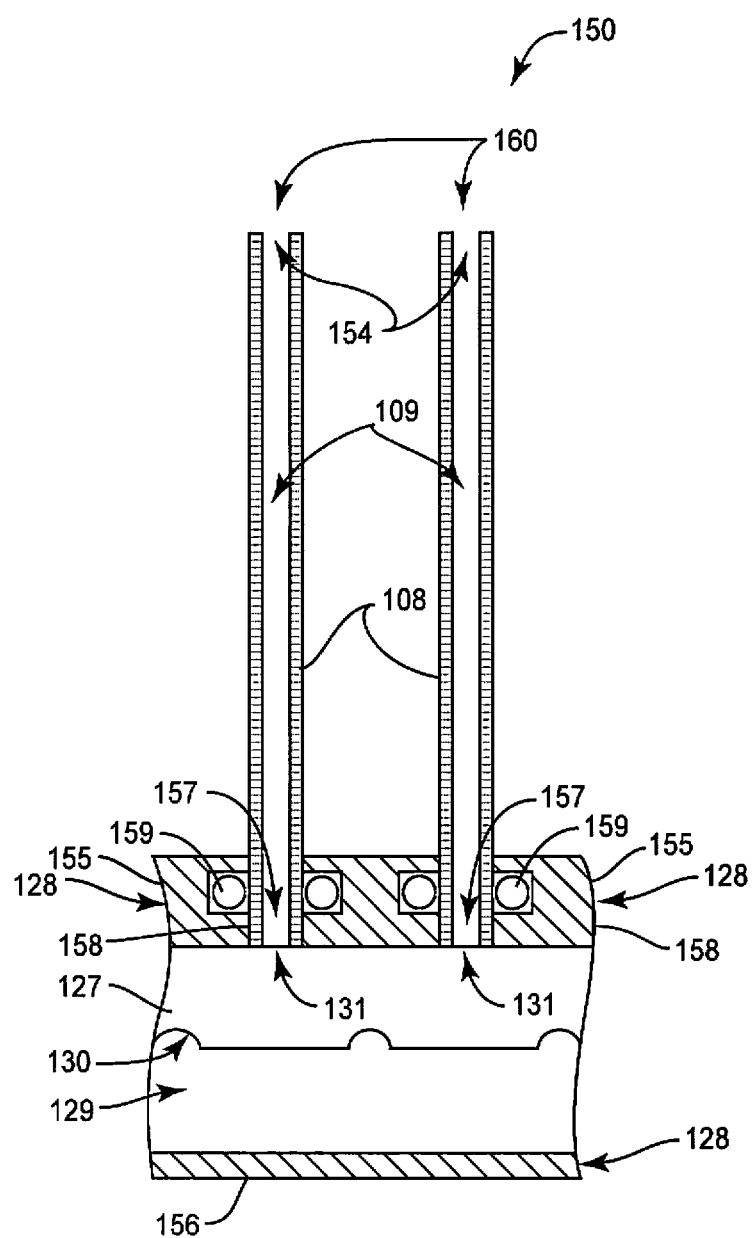
FIG. 1G is an enlarged longitudinal cross section view of a portion of the manifold and associated tubular CPOX reactor units of the gaseous fuel CPOX reformer illustrated in FIGS. 1A, 1B and 2A.

As shown in FIG. 1G, the enlarged longitudinal cross section view of manifold portion 150 of manifold 126 of reformer 100 illustrated in FIGS. 1A and 1B includes upper housing structure 155, lower housing structure 156, manifold chamber 129, gaseous CPOX reaction mixture distributor 127 and gas distributor outlets 130 in gaseous flow communication with inlets 131 of tubular CPOX reactor units 108. Inlet ends 157 of tubular CPOX reactor units 108 are firmly seated within cavities 158 formed within upper housing structure 155 and are engaged in gas-tight relationship therewith by O-ring gaskets 159. The provision of cavities 158 formed within upper housing structure 155 and O-ring gaskets retained therein simplify the requirement for a gas-tight connection between upper housing structure 155 and inlet ends 157 of tubular CPOX reactor units 108 and, in addition, greatly facilitate the separation of an inoperative or defective reactor from manifold housing 156 and the insertion of a replacement reactor unit.

Gaseous CPOX reaction mixture flows through outlets 130 of gas distributor 127, through inlets 131 of tubular CPOX reactor units 108 and into CPOX reaction zones 109 where the gaseous CPOX reaction mixture undergoes gaseous phase CPOX conversion to a hydrogen-rich, carbon monoxide-containing effluent reformate exiting the reactor units at their outlet ends 160 through associated outlets 154.

Figure 2A:
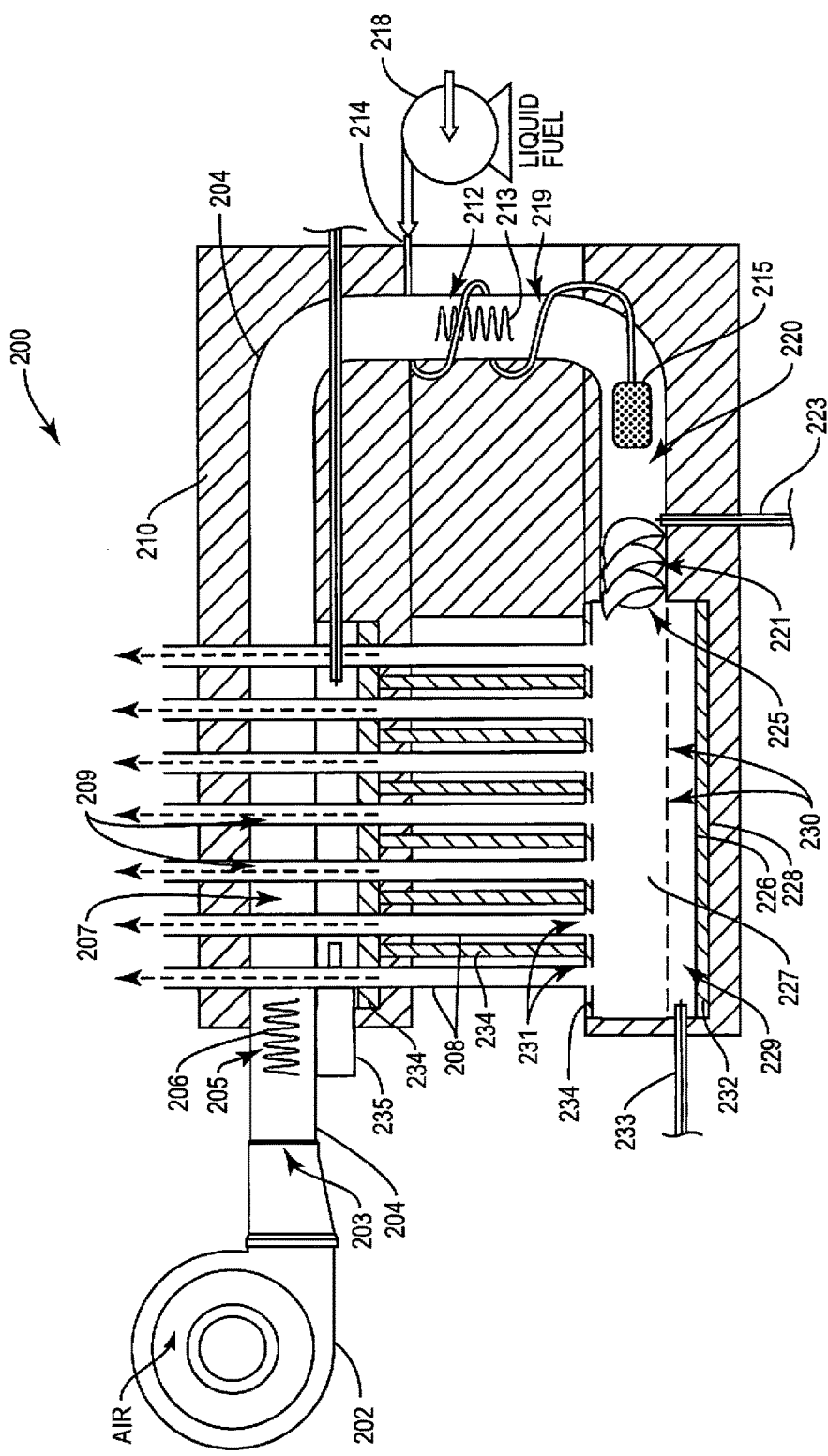
FIG. 2A is a longitudinal cross section view of an embodiment of a liquid fuel CPOX reformer incorporating a manifold component in accordance with the present teachings.
Figure 2B:
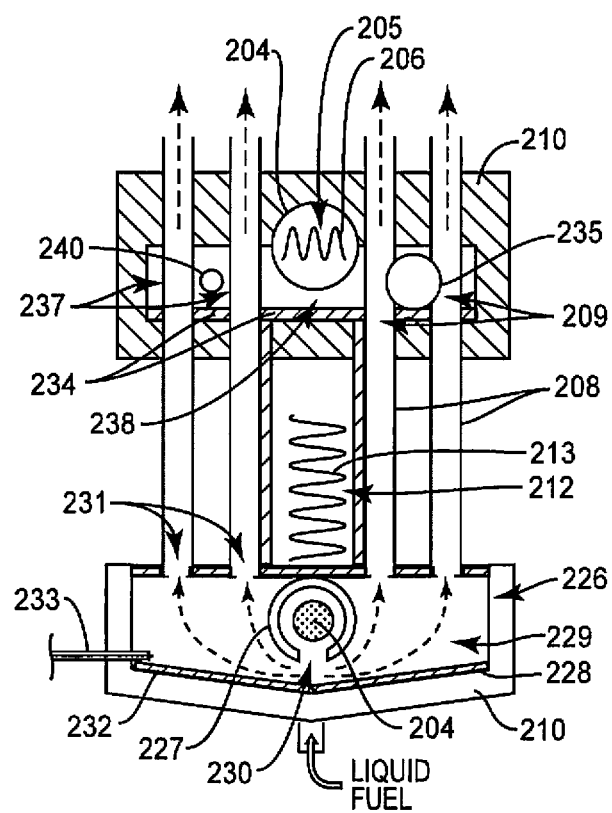
FIG. 2B is a lateral (perpendicular to the longitudinal axis) cross section view of the liquid fuel CPOX reformer illustrated in FIG. 2A

Referring now to FIGS. 2A and 2B, air as an oxygen-containing gas is introduced at ambient temperature and at a preset mass flow rate into liquid fuel CPOX reformer 200 via centrifugal blower 202 through inlet 203 of conduit 204 which includes a generally U-shaped conduit section favoring compact design. The ambient temperature air is initially heated in the start-up mode operation of reformer 200 to within a preset range of elevated temperature by passage through first heating zone 205 supplied with heat from first heater unit 206. First heater unit 206 and second heater unit 213 downstream therefrom can be of a conventional or otherwise known electrical resistance type rated, for example, at from 10 to 80 watts or even greater depending upon designed range of fuel processing capacity of the reformer. Such heaters are capable of raising the temperature of ambient air introduced into conduit 204 to a desired level for a relatively wide range of CPOX reformer configurations and operating capacities. During the steady-state mode of operation of reformer 200, first heater unit 206 can be shut off, the air introduced into conduit 204 then being initially heated within heat transfer zone 207 by heat of exotherm recovered from CPOX reaction zones 209 of elongate tubular gas-permeable CPOX reactor units 208. In this manner, the temperature of the air introduced into conduit 204 can be increased from ambient to within some preset elevated range of temperature with the particular temperature being influenced by a variety of design, i.e., structural and operational, factors as those skilled in the art will readily recognize.

Thermal insulation 210, for example, of the microporous or alumina-based refractory type, surrounds most of conduit 204 and those portions of CPOX reactor units 208 corresponding to their CPOX reaction zones 209 in order to reduce thermal losses from these components.

To raise the temperature of the air that had been initially heated by passage through first heating zone 205 and/or heat transfer zone 207, as the initially heated air continues to flow downstream in conduit 204, it passes through second heating zone 212 supplied with heat from second heater unit 213. Because the second heater unit need only increase the temperature of the initially heated air by a relatively small extent, it can function as an incremental heater capable of making the typically small adjustments in air temperature that are conducive to precise and rapid thermal management of the reformer both with regard to the functioning of its fuel vaporization system, described herein, and its tubular CPOX reactor units.

A liquid reformable fuel such as any of those mentioned above, and exemplified in this and the other embodiments of the present teachings by diesel fuel, is introduced via fuel line 214 terminating within main conduit 204 in liquid fuel spreader device 215, for example, a wick or spray device.

Any conventional or otherwise known pump device 218 for passing fluid through the passageways and conduits of a liquid fuel CPOX reformer, for example, for introducing liquid fuel through fuel line 214 into conduit 204, can be used. For example, a metering pump, rotary pump, impeller pump, diaphragm pump, peristaltic pump, positive displacement pump such as a gerotor, gear pump, piezoelectric pump, electrokinetic pump, electroosmotic pump, capillary pump, and the like, can be utilized for this purpose. As indicated above, the pressurized liquid fuel can be spread within a conduit by a wick or as a fine spray or otherwise in droplet form by any of such conventional or otherwise known spray devices as fuel injectors, pressurized nozzles, atomizers (including those of the ultrasonic type), nebulizers, and the like. A second heater unit and a fuel spreader device can function in unison to vaporize the liquid fuel introduced into the conduit and together constitute the principal components of the fuel vaporizer system of a reformer. In some embodiments, a pump or equivalent device can deliver the fuel on an intermittent or pulsed flow basis. In certain embodiments, a pump or equivalent device can deliver the fuel as a substantially continuous flow. In particular embodiments, a pump or equivalent device can make rapid adjustments in fuel flow rate in response to changing CPOX reformer operating requirements.

Although reformer 200 can use any source of heat for driving vaporization of the liquid fuel during the start-up mode of operation, for example, a heater of the electrical resistance type (as in the case of heaters 206 and 213), especially where vaporization of the fuel is made to take place outside conduit 204, heater 213 is used to not only incrementally raise the temperature of the initially heated ambient temperature air but to heat the liquid fuel prior to its introduction into conduit 204 and to provide sufficient heat for vaporizing the fuel once it enters the conduit. This optional provision for heating liquid fuel prior to its introduction into conduit 204 can make it possible to vaporize a given amount of liquid reformable fuel faster, or a greater amount of liquid fuel within a given time period, than the same vaporizer system operating upon reformable fuel which is at ambient temperature at the time it enters the conduit.

To provide for the heating of the liquid fuel before it enters conduit 204, fuel line 214 traverses the wall of conduit 204 with section 219 of the fuel line being extended in length to prolong the residence time of fuel flowing therein where the fuel line passes through, or is proximate to, second heating zone 212 of main conduit 204. An extended fuel line section can assume a variety of configurations for this purpose, for example, a coiled or helical winding (as shown) or a series of lengthwise folds, disposed on or proximate to the exterior surface of a conduit corresponding to a second heating zone or any similar such configuration disposed within the interior of the conduit at or near the second heating zone. Regardless of its exact configuration and/or disposition, extended fuel line section 219 must be in effective heat transfer proximity to second heating zone 212 so as to receive an amount of heat sufficient to raise the temperature of the fuel therein to within some preset range of temperature. Thus, a portion of the thermal output of heater 213 within second heating zone 212 of conduit 204, in addition to further heating air flowing within this zone, will transfer to fuel, for example, diesel fuel, flowing within the distal section 219 of fuel line 214, which distal section of fuel line 214 can be lengthened or extended as shown by reference numeral 219, thereby raising its temperature to within the preset range. Whichever range of temperature values is chosen for the fuel within the fuel line, it should not exceed the boiling point of the fuel (from 150° C. to 350° C. in the case of diesel) if vapor lock and consequent shut-down of reformer 200 are to be avoided.

Liquid fuel spreader 215 is disposed within conduit 204 downstream from second heating zone 212 and associated heater 213 and upstream from mixing zone 220. Thermocouple 223 is disposed within conduit 204 downstream from the vaporizer in order to monitor the temperature of the vaporized fuel-air mixture beginning to form therein.

Following its passage through static mixer 221 disposed downstream from mixing zone 222, gaseous CPOX reaction mixture exits conduit 204 through outlet 225 and enters gas distributor 227 of manifold 226 which is the same as, or similar to, both the structure and operation of manifold 126 of gaseous fuel CPOX reformer 100 of FIGS. 1A and 1B. Manifold 226 includes manifold housing, or enclosure, 228 defining manifold chamber 229 within which heated gaseous CPOX reaction mixture (gas) distributor 227 is connected to outlet 225 of conduit 204. Heated gaseous CPOX reaction mixture exiting conduit 204 through outlet 225 enters gas distributor 227 thereafter passing outwardly through apertures (e.g., holes or slots) 230 located at the bottom or lower part of the gas distributor, the gas then flowing around the exterior surface of the distributor to its top or upper part and from there into inlets 231 of tubular CPOX reactor units 208. The path of the gaseous CPOX reaction mixture as it passes through apertures 230 and into inlets 231 is shown in FIG. 2B.

To eliminate or lessen the possibility that the temperature within some region(s) and/or surface(s) of manifold chamber 229 will fall to or below the condensation temperature of the vaporized liquid reformable fuel of the gaseous CPOX reaction mixture present therein, electrical resistance heater 232 and thermocouple 233 can be disposed within manifold chamber 229, for example, on one or more of its internal surfaces or embedded within one or more of its walls, to provide an active heater system for maintaining the temperature within the chamber above the fuel condensation temperature. In addition to an active heater system, for example, as described above, or as an alternative thereto, a passive heater, or heat transfer system, comprising thermally conductive elements 234, for example, fabricated from a good conductor of heat such as copper, thermally linking CPOX reaction zones 209 of tubular CPOX reactor units 208 with manifold chamber 229 can be arranged within reformer 200 to convey heat of exotherm from CPOX reaction zones 209 to regions and/or surfaces within manifold chamber 229 so as to maintain the temperature of the vaporized fuel therein above its condensation temperature.

In addition to their function of preventing or minimizing the occurrence of fuel condensation, such active and/or passive heaters can serve to make the temperature of the gaseous CPOX reaction mixture more uniform as it is introduced into inlets 231 of CPOX reactor units 208 with consequent benefits for both reformer operation and control. Thus, for example, one or both manifold heaters can function to provide a gaseous CPOX reaction mixture of consistently uniform temperature throughout a manifold chamber such that there will be not more than about a 10% difference, for example, not more than about a 5% difference, in the temperature of gaseous CPOX reaction mixture entering any two tubular CPOX reactor units.

As in the case of manifold 126 illustrated in FIGS. 1A and 1B, some specific factors that can bear upon the optimization of the design of manifold 226 for accomplishing its function of promoting a more uniform distribution of gaseous CPOX reaction mixture to CPOX reactor units 208 include the configuration of its housing 228, the volume of its chamber 229 and the dimensions of gas distributor 227 including the number, design and placement of its apertures 230. Such factors in turn depend on such reformer design and operational factors as the target flow rates of gaseous CPOX reaction mixture within a conduit, the number and arrangement of CPOX reactor units 208, the shape and dimensions of inlets 231 of CPOX reactor units 208, and similar considerations. A manifold of optimal fuel-air distribution performance for a particular liquid fuel CPOX reformer in accordance with the present teachings can be readily constructed by those skilled in the art employing routine testing methods.

From manifold 226, heated gaseous CPOX reaction mixture enters inlets 231 of CPOX reactor units 208 and into CPOX reaction zones 209 where the reaction mixture undergoes gas phase CPOX reaction to produce a hydrogen-rich, carbon monoxide-containing reformate. As in gaseous fuel CPOX reformer 100 of FIGS. 1A and 1B, in the start-up mode of liquid fuel CPOX reformer 200, one or more igniters 235 initiates CPOX. After CPOX becomes self-sustaining, for example, when the temperature of the reaction zone reaches from about 250° C. to about 1100° C., the igniter(s) can be shut off as external ignition is no longer required to maintain the now self-sustaining CPOX reaction.

Further in accordance with the present teachings, steam can be introduced into the reformer so that the reformer may be operated to carry out autothermal and/or steam reforming reaction(s).

In one embodiment, the reformer can be initially operated to perform CPOX conversion of a liquid or gaseous reformable fuel thereby providing heat of exotherm that, with or without additional heat, for example, supplied by an electric heater, can be recovered to produce steam in a steam generator. The thus-generated steam can be introduced into the reformer in one or more locations therein. One suitable location is the evaporator where the steam can provide heat to vaporize liquid fuel. For example, steam introduced into wick 515 in reformer 500 illustrated in FIG. 5 can provide heat for vaporizing liquid fuel on wick surfaces at the same time helping to eliminate or suppress clogging of such surfaces.

In another embodiment, a reformer in accordance with the present teachings can be connected to a fuel cell stack in which hydrogen-rich reformate from the reformer is converted to electrical current. Operation of the fuel cell stack, and where present an associated afterburner unit, can provide source(s) of waste heat that can be recovered and utilized for the operation of a steam generator, again, with or without additional heat such as that supplied by an electric heater. The steam from the steam generator can then be introduced into the reformer, for example, through wick 515 of reformer 500 of FIG. 5, to support autothermal or steam reforming. In this arrangement of integrated reformer and fuel cell stack, the source(s) of waste heat referred to can supply the necessary heat to drive endothermic reaction(s) that are involved in autothermal and steam reforming processes.

In sum, it should be understood that the delivery systems of the present teachings can deliver the appropriate reactants for carrying out reforming reactions including partial oxidation ("POX") reforming such as catalytic partial oxidation ("CPOX") reforming, steam reforming, and autothermal ("AT") reforming. The liquid reactants such as liquid reformable fuels and water can be delivered from and through the "liquid reformable fuel" delivery components, conduits, and assemblies of the delivery system. The gaseous reactants such as gaseous reformable fuels, steam, and an oxygen-containing gas such as air can be delivered from and through the "gaseous reformable fuel" delivery components, conduits, and assemblies of the delivery system. Certain gaseous reactants such as steam and an oxygen-containing gas can be delivered from and through components and assemblies that are peripheral or secondary to the delivery systems of the present teachings, for example, an oxygen-containing gas can be delivered from a source of oxygen-containing gas that is independently in operable fluid communication with at least one of a vaporizer, a reformer, and a fuel cell stack of a fuel cell unit or system, for example, to mix with a liquid reformable fuel and/or a vaporized liquid reformable fuel prior to reforming.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:
1. A chemical reactor system comprising:
a chemical reactor having an inlet; and
a manifold in fluid communication with the inlet of the chemical reactor, the manifold comprising a manifold housing, the manifold housing defining a manifold chamber and having at least one additional component selected from the group consisting of:
a gaseous reactants distributor disposed within, and extending for at least a majority of the length of, the manifold chamber, wherein the gaseous reactants distributor is in fluid communication with a gaseous reactants conduit, and the gaseous reactants distribu- tor comprises one or more outlets facing in an opposite direction with respect to the inlet of the chemical reactor;

a heater in thermal communication with the manifold chamber; and a cavity, wherein the manifold housing defines the cavity, a seal is disposed within or adjacent to the cavity, and the seal engages the inlet of the chemical reactor thereby providing a gas-tight seal between the manifold housing and the inlet.

2. The chemical reactor system of Claim 1 wherein the chemical reactor is a fixed bed reactor, a fluidized bed reactor, a microchannel reactor, a shell-and-tube reactor, a tubular reactor, a multi-tubular reactor, or a combination thereof.

3. The chemical reactor system of claim 1 wherein the seal is a gasket.

4. The chemical reactor system of claim 1 wherein the chemical reactor is adapted to carrying out a gas phase reaction selected from the group consisting of acetylation, addition reactions, alkylation, dealkylation, hydrodealkylation, reductive alkylation, amination, aromatization, arylation, reforming, carbonylation, decarbonylation, reductive carbonylation, carboxylation, reductive carboxylation, reductive coupling, condensation, cracking, hydrocracking, cyclization, cyclooligomerization, combustion, dehalogenation, dimerization, epoxidation, esterification, exchange, Fischer-Tropsch, gasification, halogenation, hydrohalogenation, homologation, hydration, dehydration, hydrogenation, dehydrogenation, hydrocarboxylation, hydrofolinylation, hydrogenolysis, hydrometallation, hydrolysis, hydroprocessing, hydrotreating, isomerization, methylation, demethylation, metathesis, nitration, oxidation, partial oxidation, polymerization, reduction, sulfonation, telomerization, transesterification, trimerization and water gas shift.

5. The chemical reactor system of claim 1 wherein the chemical reactor comprises a plurality of tubular reactor units.

6. The chemical reactor system of claim 1 wherein the manifold housing is fabricated from a material that remains thermally and mechanically stable at the temperature of operation of the chemical reactor.

7. The chemical reactor system of claim 1 wherein the heater is an electrical resistance heater disposed within the manifold chamber and/or at least one thermally conductive element in thermal communication with the manifold and a reaction zone of the chemical reactor.

8. The chemical reactor system of claim 1, wherein the chemical reactor comprises a plurality of tubes having tube inlets, the tubes adapted to perform a chemical reaction and the reactor system comprising an elongated gaseous reactants distributor having an opening or openings facing away from the tube inlets.

9. The chemical reactor system of claim 1, comprising an electrical resistance heater located within the manifold chamber.

10. The chemical reactor system of claim 1, comprising the gaseous reactants distributor or the heater.

11. A reformer system for reforming at least one reformable fuel to produce a hydrogen-rich reformate, the reformer comprising:

a reformer reactor unit having an inlet; and a manifold in fluid communication with the inlet of the reformer reactor unit, the manifold comprising a manifold housing, the manifold housing defining a manifold chamber and having at least one additional component selected from the group consisting of:

a gaseous reforming reactants distributor disposed within, and extending for at least a majority of the length of the manifold chamber, wherein the gaseous reactants distributor is in fluid communication with a reactants conduit, and the gaseous reactants distributor comprises one or more outlets having openings facing in an opposite direction away from the inlet of the reformer reactor;

a heater in thermal communication with the manifold chamber; and a cavity, wherein the manifold housing defines the cavity, a seal is disposed within or adjacent to the cavity, and the seal engages the inlet of the reformer reactor thereby providing a gas-tight seal between the manifold housing and the inlet.

12. The reformer system of claim 11 wherein the manifold housing is fabricated from a material that remains thermally and mechanically stable at the temperature of the reforming reaction zone during operation of the at least one reformer reactor.

13. The reformer system of claim 11 wherein the heater is an electrical resistance heater disposed within the manifold chamber and the passive heater assembly includes at least one thermally conductive element in thermal communication with the manifold and a reaction zone of the reformer reactor.

14. The reformer system of claim 11 which comprises a plurality of tubular reforming reactor units.

15. The reformer system of claim 11 which is a catalytic partial oxidation reformer.

16. The reformer system of claim 11, comprising the gaseous reactants distributor or the heater.

17. The reformer system of claim 11, wherein the reformer reactor unit comprises a plurality of tubes having tube inlets, the tubes adapted to perform a. chemical reformation reaction and the reformer reactor unit comprising an elongated gaseous reactants distributor having an opening or openings facing away from the tube inlets.

18. The reformer system of claim 11, comprising an electrical resistance heater located within the manifold chamber.

* * * * *